US008675760B2

(12) United States Patent
Zheng et al.

(10) Patent No.: US 8,675,760 B2
(45) Date of Patent: Mar. 18, 2014

(54) METHOD AND SYSTEM FOR SELECTING A USER GROUP USING HYBRID-QUANTIZED CHANNEL DIRECTION INFORMATION FEEDBACKS FROM MIMO CAPABLE MOBILE DEVICES

(75) Inventors: Jun Zheng, San Diego, CA (US); Mark Kent, Vista, CA (US); Vinko Erceg, Cardiff, CA (US)

(73) Assignee: Broadcom Corporation, Irvine, CA (US)

( * ) Notice: Subject to any disclaimer, the term of this patent is extended or adjusted under 35 U.S.C. 154(b) by 581 days.

(21) Appl. No.: 12/652,137

(22) Filed: Jan. 5, 2010

(65) Prior Publication Data

US 2011/0164695 A1   Jul. 7, 2011

Related U.S. Application Data

(63) Continuation-in-part of application No. 11/232,340, filed on Sep. 21, 2005, now Pat. No. 7,826,416, and a continuation-in-part of application No. 11/231,557, filed on Sep. 21, 2005.

(51) Int. Cl.
*H04B 7/02* (2006.01)
(52) U.S. Cl.
USPC .......................................... 375/267; 375/219
(58) Field of Classification Search
USPC .......... 375/224, 260, 267, 219; 370/252, 281, 370/330
See application file for complete search history.

(56) References Cited

U.S. PATENT DOCUMENTS

| | | | | |
|---|---|---|---|---|
| 7,327,795 B2 * | 2/2008 | Oprea | ........................... | 375/260 |
| 7,764,746 B2 * | 7/2010 | Clerckx et al. | ................ | 375/267 |
| 7,792,206 B2 * | 9/2010 | Ylitalo et al. | ................. | 375/267 |
| 7,983,217 B2 * | 7/2011 | Alamouti et al. | ............. | 370/330 |
| 2007/0064632 A1 * | 3/2007 | Zheng et al. | ................... | 370/281 |
| 2007/0064829 A1 * | 3/2007 | Zheng et al. | ................... | 375/267 |
| 2008/0292012 A1 * | 11/2008 | Kim et al. | ...................... | 375/260 |
| 2008/0317145 A1 * | 12/2008 | Clerckx et al. | ................ | 375/260 |
| 2009/0323545 A1 * | 12/2009 | Zhou et al. | .................... | 370/252 |
| 2009/0323848 A1 * | 12/2009 | Guthy et al. | ................... | 375/267 |
| 2010/0098144 A1 * | 4/2010 | Clerckx et al. | ................ | 375/224 |

* cited by examiner

*Primary Examiner* — Daniel Washburn
*Assistant Examiner* — Fitwi Hailegiorgis
(74) *Attorney, Agent, or Firm* — Garlick & Markison

(57) ABSTRACT

A mobile device receives beams orthogonal to a single user downlink MIMO channel associated with a selected first user in a user group. The mobile device estimates relative channel direction information with respect to the received beams for an associated single user downlink MIMO channel. The estimated relative channel direction information is hybrid-quantized to generate a semi-orthogonal matrix transmitted to the base station over a finite-rate feedback link. The mobile device receives downlink data transmission according to the hybrid-quantized relative channel direction information. The base station receives multiple semi-orthogonal matrices from remaining mobile devices to generate a semi-orthogonal group for the selected first user. A mobile device having the strongest quantized projected channel capacity is selected from the generated semi-orthogonal group as a second user. Mutual channel capacity information for the selected first and second users is determined to schedule corresponding downlink data transmissions, accordingly.

20 Claims, 4 Drawing Sheets

METHOD AND SYSTEM FOR SELECTING A USER GROUP USING HYBRID-QUANTIZED CHANNEL DIRECTION INFORMATION FEEDBACKS FROM MIMO CAPABLE MOBILE DEVICES

CROSS-REFERENCE TO RELATED APPLICATIONS/INCORPORATION BY REFERENCE

This application claims priority pursuant to 35 U.S.C. §120 as a continuation-in-part (CIP) application of U.S. application Ser. No. 11/232,340 filed on Sep. 21, 2005, now U.S. Pat. No. 7,826,416, and claims priority pursuant to 35 U.S.C. §120 as a continuation-in-part (CIP) application of U.S. application Ser. No. 11/231,557 filed on Sep. 21, 2005 Furthermore, this application is related to U.S. application Ser. No. 12/652,124 filed on Jan. 5, 2010.

All of the above stated applications are hereby incorporated herein by reference in their entirety.

FIELD OF THE INVENTION

Certain embodiments of the invention relate to signal processing for communication systems. More specifically, certain embodiments of the invention relates to a method and system for selecting a user group using hybrid-quantized channel direction information feedbacks from MIMO capable mobile devices.

BACKGROUND OF THE INVENTION

Wireless communication systems are widely deployed to provide various types of communication such as voice and data for a number of associated users. These systems may be implemented based on various access techniques such as, for example, code division multiple access (CDMA), time division multiple access (TDMA), frequency division multiple access (FDMA), or some other multiple access techniques.

A multiple-input multiple-output (MIMO) communication system employs multiple transmit ($N_T$) antennas and multiple receive ($N_R$) antennas for communicating multiple spatially independent data streams. In an exemplary MIMO downlink communication system, the transmitter (e.g., a base station) is provided with multiple antennas capable of transmitting multiple spatially independent data streams, while the receiver (e.g., a mobile device) is equipped with multiple receive antennas to receive one or more of the multiple spatially independent data streams transmitted by the base station. The connection between the multiple-antenna base station and a single multiple-antenna mobile device is called a MIMO channel, which is formed by multiple ($N_T$) transmit antennas and multiple ($N_R$) receive antennas. A MIMO channel may be decomposed into $N_C$ independent channels, with $N_C \leq \min\{N_T, N_R\}$. Each of the $N_C$ independent channels is referred to as a spatial subchannel of the single user downlink MIMO channel. Different MIMO channels experience different link characteristics and are associated with different transmission capability.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for selecting a user group using hybrid-quantized channel direction information feedbacks from MIMO capable mobile devices, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for selecting a user group using hybrid-quantized channel direction information feedbacks from MIMO capable mobile devices. In various embodiments of the invention, a communication device such as a mobile device is operable to receive beams orthogonal to a single user downlink MIMO channel between a base station and a selected first user in a user group. The mobile device is operable to estimate relative channel direction information with respect to the received plurality of beams for an associated single user downlink MIMO channel between the base station and the mobile device. The estimated relative channel direction information may be hybrid-quantized, that is, the estimated relative channel direction information is first soft quantized and then the resulting soft quantized relative channel direction information is further hard quantized using a predetermined threshold value. The mobile device may be operable to receive downlink data transmission from the base station according to the hybrid-quantized relative channel direction information. The mobile device is operable to generate a semi-orthogonal matrix with respect to the received beams using the hybrid-quantized relative channel direction information. The generated semi-orthogonal matrix is transmitted to the base station over a finite-rate feedback link. The base station is operable to receive multiple semi-orthogonal matrices from remaining mobile devices. A semi-orthogonal group for the selected first user is generated according to the received semi-orthogonal matrices from the remaining mobile devices. The generated semi-orthogonal group for the first selected user comprises mobile devices with beams over associated single user MIMO channels approximately orthogonal or semi-orthogonal to the single user downlink MIMO channel between the base station and the selected first user. The base station may be operable to select a mobile device having the strongest quantized projected channel capacity from the generated semi-orthogonal group as a second user for the user group. The base station is operable to determine total mutual channel capacity of the selected first user and the selected second user, so as to schedule downlink data transmissions intended to the selected first user and/or the selected second user.

Figure 1:
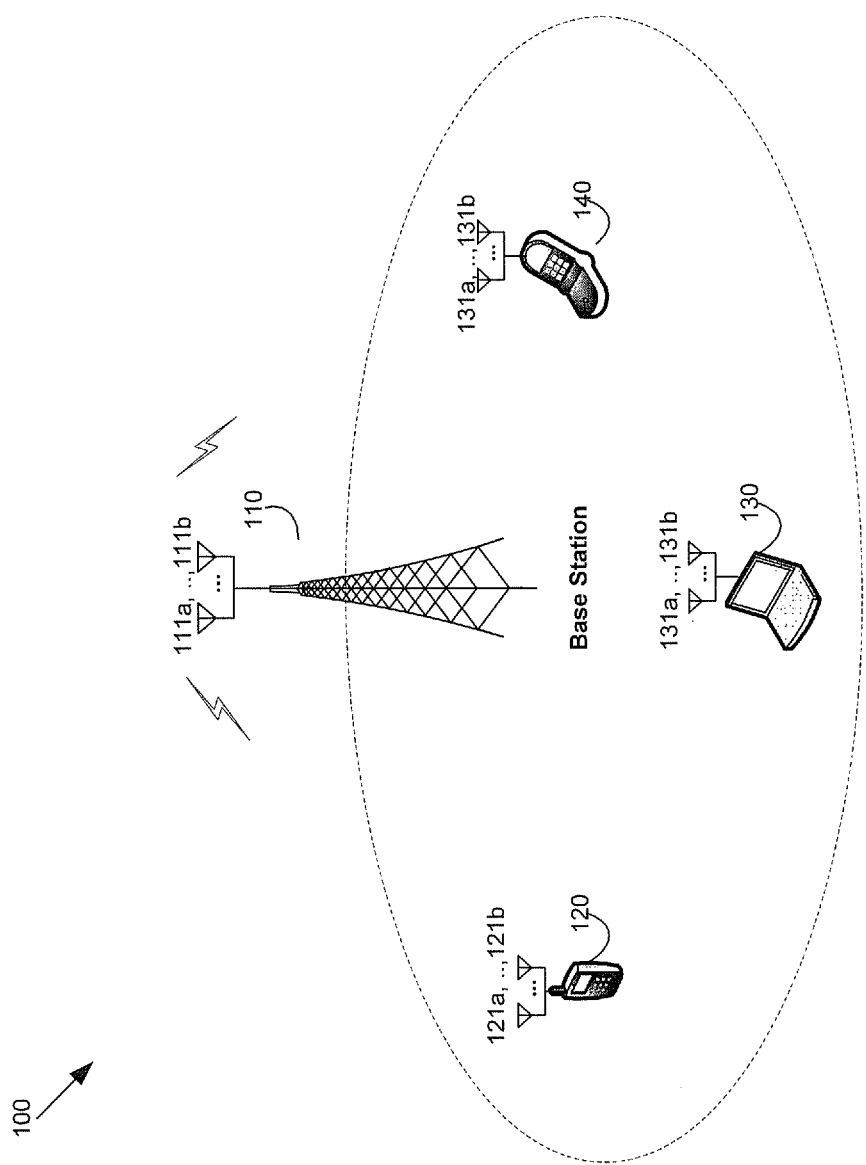
FIG. 1 is a diagram of an exemplary multiple-input-multiple-output (MIMO) communication system that is operable to expedite user group selection by using hybrid-quantized channel direction information from MIMO capable mobile devices, in accordance with an embodiment of the invention.

FIG. 1 is a diagram of an exemplary multiple-input-multiple-output (MIMO) communication system that is operable to expedite user group selection by using hybrid-quantized channel direction information from MIMO capable mobile devices, in accordance with an embodiment of the invention. Referring to FIG. 1, there is shown a MIMO communication system 100. The MIMO communication system 100 comprises a base station 110 and a plurality of associated mobile devices, of which mobile devices 120-140 are illustrated. The base station 110 comprises multiple available transmit antennas 111a-111b. Each of the mobile devices 120-140 is equipped with multiple available receive antennas, for example, receive antennas 121a-121b, receive antennas 131a-131b, or receive antennas 141a-141b.

The base station 110 may comprise suitable logic, circuitry, interfaces and/or code that may be operable to perform air interface processing and schedule communication resources such as spectrum and/or time slots in both uplink communications and downlink communications to various associated mobile devices such as the mobile device 120 in a timely manner. The base station 110 may be operable to determine which associated mobile device may receive a data packet and at what time the receiving should occur. The base station 110 may be operable to concurrently communicate with a plurality of associated mobile devices such as the mobile devices 120-140. In this regard, the base station 110 may be operable to communicate multiple spatially independent data streams over one or more single user downlink MIMO channels. A single user downlink MIMO channel is formed by multiple transmit ($N_T$) antennas at the base station 110 and multiple receive antennas equipped on a single mobile device such as the mobile device 120. Channel state information (CSI) for corresponding single user downlink MIMO channels may be received or reported from the mobile devices 120-140. The received CSI may comprise corresponding MIMO channel quality information. Specifically, the received CSI may comprise channel quality information for each spatial subchannel of corresponding single user downlink MIMO channels. For example, in instances where the base station 110 may be equipped with M available transmit antennas and the mobile device 120 may have N available receive antennas, the single user downlink MIMO channel between the base station 110 and the mobile device 120 comprises M×N spatial subchannels. Accordingly, the received CSI from the mobile device 120 may be represented as an M×N CSI matrix. Channel quality information may comprise, for example, channel capacity or rate, signal to noise ratios (SNRs), channel quality indicator (CQI), channel gain and/or channel direction information. The CSI received from the mobile device 120 may indicate average channel quality information over the entire M×N spatial subchannels.

The base station 110 may be operable to receive CSI from the mobile devices 120-140 over a finite-rate feedback link. In this regard, quantized CSI may be received over the finite-rate link from the mobile devices 120-140. The received quantized CSI may comprise corresponding quantized single user downlink MIMO channel quality information such as, for example, quantized signal to noise ratios (SNRs), quantized CQI, and/or quantized channel capacity and/or quantized channel direction information. Specifically, the received CSI may comprise quantized channel quality information for each spatial subchannel of corresponding single user downlink MIMO channels. For the base station 110 with M available transmit antennas and a multi-antenna mobile device with N available receive antennas, the CSI received from the mobile device 120 may be an M×N CSI matrix indicating average channel quality information over the entire M×N spatial subchannels.

The base station 110 may be operable to process or decode the received quantized CSI for scheduling downlink data transmissions. In this regard, the base station 110 may be operable to manage and/or control downlink data transmissions according to corresponding processed CSI. One or more multi-antenna mobile devices such as the mobile device 120-140 may be selected to form a user group for downlink data transmissions. In this regard, the base station 110 may be operable to select a multi-antenna mobile device, for example, the mobile device 120, having the strongest channel capacity as a first user in the user group. The base station 110 may be operable to send a request to the selected first user (the mobile device 120) for channel direction information specific to a single user downlink MIMO channel between the base station 210 and the selected first user, i.e., the mobile device 120. Subsequently, the base station 110 may be operable to receive hybrid-quantized channel direction information from the mobile device 120. The hybrid-quantized channel direction information is generated by the mobile device 120 via soft quantization followed by hard quantization of the corresponding channel direction information.

The received hybrid-quantized channel direction information may comprise hybrid-quantized channel direction information for each spatial subchannel of the single user downlink MIMO channel between the base station 210 and the mobile device 120. The hybrid-quantized channel direction information received from the mobile device 120 may be a channel direction matrix indicating average channel direction information over the entire associated spatial subchannels. The base station 110 may be operable to calculate a complementary orthogonal matrix for the received channel direction matrix from the selected first user (the mobile device 120). The base station 110 may be operable to broadcast the calculated complementary orthogonal matrix, which indicates beams approximately orthogonal to beams associated with the single user downlink MIMO channel between the base station 210 and the selected first user, i.e., the mobile device 120.

In various embodiments of the invention, the base station 110 may be operable to receive quantized relative channel direction information and/or quantized channel capacity with respect to the broadcast complementary orthogonal matrix over the finite-rate feedback channel from the remaining mobile devices. The received quantized channel capacity is referred to a quantized projected channel capacity over the broadcast complementary orthogonal matrix. In addition, the received quantized relative channel direction information may comprise a semi-orthogonal flag matrix from each of the remaining mobile devices. The received semi-orthogonal flag matrices indicate whether beams of corresponding single user downlink MIMO channel are semi-orthogonal or approximately orthogonal to the beams associated with the single user downlink MIMO channel between the base station 210 and the selected first user, i.e., the mobile device 120. The base station 110 may be operable to select one or more mobile devices according to the received quantized relative channel direction information to form a semi-orthogonal group for the selected first user, i.e., the mobile device 120. The semi-orthogonal group comprises mobile devices with beams of corresponding single user downlink MIMO channels semi-orthogonal or approximately orthogonal to beams of the single user downlink MIMO channel between the base station 210 and the selected first user. A mobile device having the strongest quantized projected channel capacity within the semi-orthogonal group may be selected as a second user for the user group. The user selection process for the user group may be continued and one or more additional mobile devices may be added to the user group depending on the need and/or system capacity. Each mobile device within the user group may be approximately orthogonal or semi-orthogonal to each other. The base station 110 may be operable to schedule corresponding downlink data transmissions intended to one or more mobile devices in the user group.

A multi-antenna mobile device such as the mobile device 120 may comprise suitable logic, circuitry and/or code that may be operable to communicate with a wireless communication network such as a WCDMA network via an associated serving base station such as the base station 110. The mobile device 120 may be operable to employ multiple available receive antennas, for example, the receive antennas 121a-121b, to concurrently receive multiple spatially independent data streams from the base station 110. The mobile device 120 may be operable to measure or estimate channel quality information, for example, channel direction, channel capacity, channel maximum mutual information rate, and/or CQI for each spatial subchannel of a single user downlink MIMO channel from the transmit antennas 111a-111b to the receive antennas 121a-121b. The channel quality measurement may be performed with respect to one or more specific beams broadcasted by the base station 110. Each channel quality measurement may be quantized according to capacity of a finite-rate feedback link, for example, so as to maximize throughput and/or increase processing speed and efficiency.

The mobile device 120 may be operable to communicate or report the quantized channel quality measurements as quantized channel state information (CSI) over a finite-rate feedback link with the base station 110. In instances where the mobile device 120 may be a candidate for a user group for downlink data transmission, the mobile device 120 may be operable to receive a complementary orthogonal matrix with respect to beams of, for example, a single user downlink MIMO channel of a first selected user in the user group. In this regard, the mobile device 120 may be operable to generate hybrid-quantized channel direction information. A hybrid-quantization comprises a soft quantization followed by a hard quantization. A soft quantization is a multi-level quantization (quantization level greater than 2), while a hard quantization is a binary quantization. The mobile device 120 may be operable to first generate soft (multi-level) quantized relative channel direction information and quantized projected channel capacity with respect to the received complementary orthogonal matrix. The generated soft quantized relative channel direction information may be further hard quantized to generate a semi-orthogonal flag matrix. The generated semi-orthogonal flag matrix indicates whether beams of the single user downlink MIMO channel between the base station 110 and the mobile device 120 are semi-orthogonal or approximately orthogonal to the beams indicated in the received complementary orthogonal matrix. The generated semi-orthogonal flag matrix may be communicated with the base station 110 over the finite-rate feedback link. Downlink data transmission intended for the mobile device 120 may be scheduled for communication by the base station 110 according to the reported CSI and/or the semi-orthogonal flag matrix from the mobile device 120.

In an exemplary operation, a multi-antenna base station such as the base station 110 may be operable to concurrently communicate with a plurality of associated multi-antenna mobile devices such as the mobile devices 120-140. The base station 110 may be operable to communicate multiple spatially independent data streams using multiple available antennas such as the antennas 111a-111b to the mobile devices 120-140. Each multi-antenna mobile device such as the mobile device 120 may be operable to generate user specific channel state information (CSI) for a single user downlink MIMO channel between the base station and the mobile device 120. The generated user specific CSI may comprise channel quality information such as channel capacity, channel direction information, projected channel capacity and/or relative channel direction information of the associated single user downlink MIMO channel.

The mobile device 120 may be operable to quantize the generated user specific CSI according to the capacity of a finite-rate feedback link. The quantized CSI may be communicated with the base station 110 over the finite-rate feedback link and/or application. The base station 110 may be operable to process quantized CSI received from multi-antenna mobile devices. The processed CSI may be utilized by the base station 110 to perform user group selection. A multi-antenna mobile device such as the mobile device 120 associated with the strongest channel capacity may be selected as a first user for a user group. Quantized channel direction information for the selected first user may be further reported to the base station 110. The base station 110 may be operable to calculate a complementary orthogonal matrix for the reported quantized channel direction information from the selected first user. The calculated complementary orthogonal matrix indicating beams orthogonal to channel directions reported from the first selected user may be broadcasted. Each of the remaining mobile devices may be operable to generate soft quantized relative channel direction information and quantized projected channel capacity with regard to the broadcast beams. The generated soft quantized relative channel direction information may further be hard quantized to generate a corresponding semi-orthogonal flag matrix for each remaining mobile device. The generated semi-orthogonal flag matrix for a specific remaining mobile device such as the mobile device 140 indicates whether beams of the single user downlink MIMO channel between the base station 110 and the mobile device 140 are semi-orthogonal or approximately orthogonal to the beams indicated in the received complementary orthogonal matrix. The generated semi-orthogonal flag matrices may be communicated with the base station 110 over the finite-rate feedback link. The base station 110 may be operable to form a semi-orthogonal group for the selected first user according to the received semi-orthogonal flag matrices. The base station 110 may be operable to select a mobile device having the strongest quantized projected channel capacity within the semi-orthogonal group as a second user for the user group. The base station 110 may be operable to schedule and/or manage downlink data transmissions intended to the selected first user and/or the selected second user in the user group when need.

Figure 2:
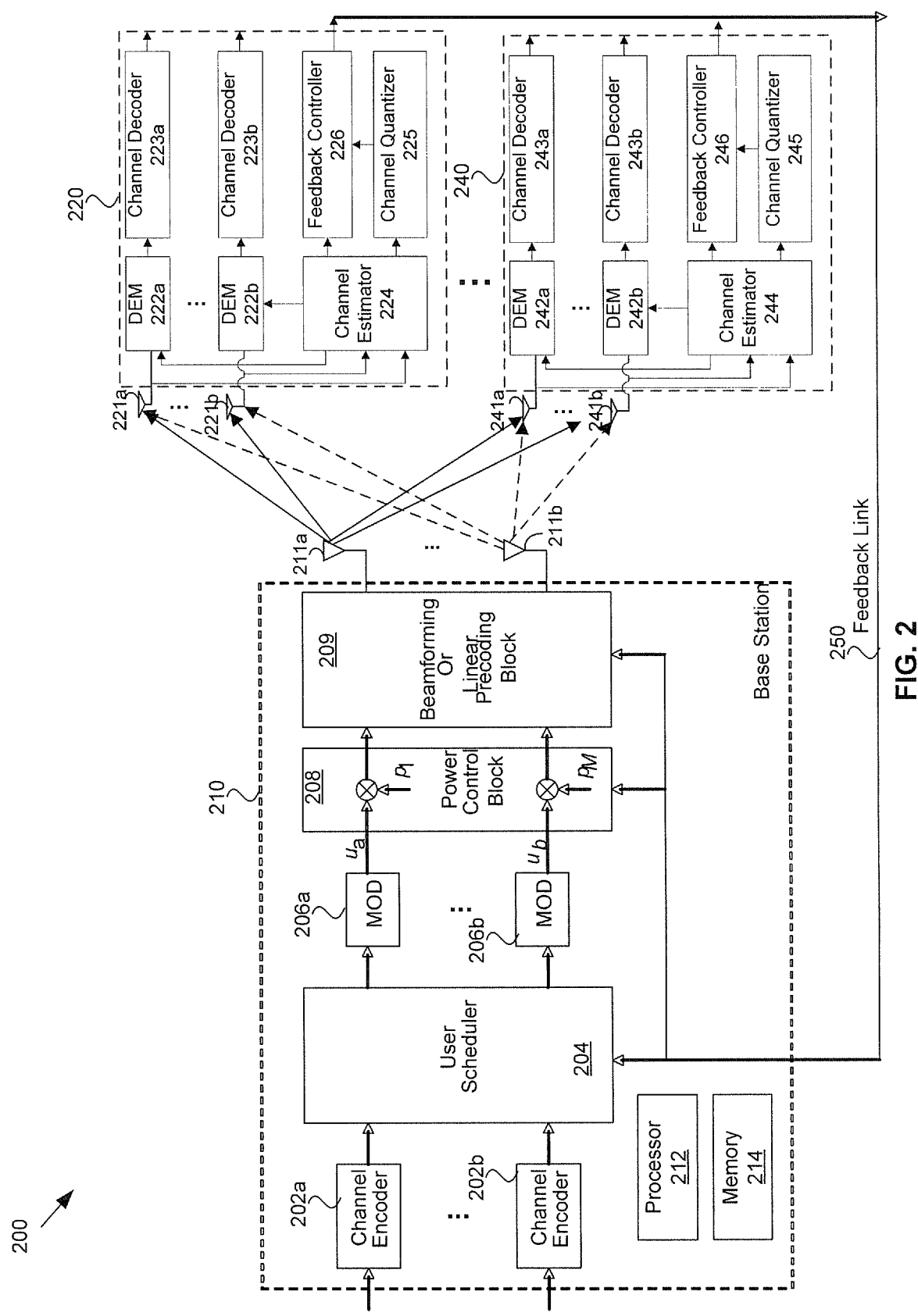
FIG. 2 is a block diagram illustrating an exemplary MIMO downlink transmission system that is operable to accelerate downlink data transmission scheduling by using hybrid-quantized channel direction information from MIMO capable mobile devices, in accordance with an embodiment of the invention.

FIG. 2 is a block diagram illustrating an exemplary single user downlink MIMO downlink transmission system that is operable to accelerate downlink data transmission scheduling by using hybrid-quantized channel direction information from MIMO capable mobile devices, in accordance with an embodiment of the invention. Referring to FIG. 2, there is shown a MIMO downlink communication system 200 comprising a base station 210, a plurality of mobile devices, of which mobile devices 220-240 are illustrated, and a feedback link 250.

The base station 210 may comprise a plurality of channel encoders 202a-202b, a user scheduler 204, a plurality of modulators (MOD) 206a-206b, a power control block 208, a beamforming or linear precoding block 210, a plurality of transmit antennas 211a-211b, a processor 212, and a memory 214.

A transmit antenna such as the transmit antenna 211a may comprise suitable logic, circuitry, interfaces and/or code that may be operable to transmit a spatially independent data stream. The transmit antenna 211a may be scheduled and/or assigned to transmit a spatially independent data stream to receive antennas of selected mobile devices. In this regard, the transmit antenna 211a may be operable to transmit a spatially independent data stream over a plurality of spatial subchannels associated with a single user downlink MIMO channel between the base station 210 and a selected mobile device. For example, the transmit antenna 211a may be operable to transmit a spatially independent data stream over spatial subchannels between the transmit antenna 211a and each of the receive antennas 221a-221b, respectively, of the mobile device 220.

A channel encoder such as the channel encoder 202a may comprise suitable logic, circuitry, interfaces and/or code that may be operable to encode input binary data streams intended to mobile devices such as the mobile devices 220-240.

The user scheduler 204 may comprise suitable logic, circuitry, interfaces and/or code that may be operable to locate and/or select a user group from a plurality of associated mobile devices such as the mobile devices 220-240 so as to optimize system performance, for example, maximizing overall throughput of the system. The user scheduler 204 may be operable to perform user group selection according to quantized CSI provided or reported from the mobile devices 220-240 over the feedback link 250. A user (mobile device) having the strongest channel capacity may be selected as a first user in the user group. The user scheduler 204 may be operable to further acquire channel direction information from the selected first user. In return, the user scheduler 204 may be operable to receive hybrid-quantized channel direction information from the selected first user. The received hybrid-quantized channel direction information may indicate beams associated with a single user downlink MIMO channel between the base station 210 and the selected first user such as the mobile device 220. A complementary orthogonal matrix indicating beams orthogonal to the single user downlink MIMO channel between the base station 210 and the selected first user is broadcasted.

The user scheduler 204 may be operable to receive a semi-orthogonal flag matrix from each of the remaining mobile devices. The received semi-orthogonal flag matrices indicate whether beams of corresponding single user downlink MIMO channels are semi-orthogonal or approximately orthogonal to the beams indicated in the broadcasted complementary orthogonal matrix. The user scheduler 204 may be operable to identify mobile devices in a semi-orthogonal group of the selected first user according to the received semi-orthogonal flag matrices. The user scheduler 204 may be operable to select a mobile device having the strongest quantized projected channel capacity within the semi-orthogonal group as a second user for the user group. The user scheduler 204 may be operable to schedule and/or manage downlink data transmissions intended for the selected first user and/or the selected second user in the user group according to corresponding system capacity information, for example.

A modulator such as the MOD 206a may comprise suitable logic, circuitry, interfaces and/or code that may be operable to modulate channel encoded binary data of a selected user (a selected mobile device).

The power control block 208 may comprise suitable logic, circuitry, interfaces and/or code that may be operable to control and/or manage power levels of different user signals according to corresponding channel quality information such as, for example, CSI received over the feedback link 150.

The beamforming or linear precoding block 210 may comprise suitable logic, circuitry, interfaces and/or code that may be operable to process data streams and separate the processed data streams into multiple spatially independent data streams for transmission. In instances where the base station 210 may be equipped with, for example, M available transmit antennas, where M is an integer and M>1, the beamforming or linear precoding block 210 may be operable to separate the processed data streams into at most M different spatially independent signals. In instances where each intended mobile device (receiver) may be equipped with, for example, N receive antennas, where N is an integer and N>1, a single user downlink MIMO channel between the base station 210 and an intended mobile device may comprise at most M×N spatial subchannels. The beamforming or linear precoding block 210 may be operable to transmit to at most M spatially independent data streams over M single user downlink MIMO channels comprising total M×N special subchannels, at a time. M or less mobile devices may be selected among associated mobile devices for downlink transmissions.

The processor 212 may comprise suitable logic, circuitry, interfaces and/or code that may be operable to manage and/or control operations of associated operation components such as, for example, the channel encoders 202a-202b and the user scheduler 204. The processor 212 may be operable to process and/or handle signals communicated between the base station 210 and a plurality of associated mobile devices such as the mobile devices 220-240.

The memory 214 may comprise suitable logic, circuitry, interfaces and/or code that may be operable to store information such as executable instructions and data that may be utilized by the processor 212. The executable instructions may comprise functions that may be applied to various signal processes such as user group selection and/or power control. The memory 214 may comprise RAM, ROM, low latency nonvolatile memory such as flash memory and/or other suitable electronic data storage.

Each mobile device such as, for example, the mobile device 220 may comprise a plurality of receive antennas 221a-221b, a plurality of demodulators (DEM) 222a-222b, a plurality of channel decoders 223a-223b, a channel estimator 224, a channel quantizer 225, and a feedback controller 226.

A receive antenna such as the receive antenna 221a may comprise suitable logic, circuitry, interfaces and/or code that may be operable to receive multiple spatially independent data streams. The receive antenna 221a may be scheduled and/or assigned to receive multiple spatially independent data streams from multiple available transmit antennas of the base station 210. In this regard, the receive antenna 221a may be operable to receive multiple spatially independent data streams over multiple spatial subchannels of a single user downlink MIMO channel between the mobile device 220 and the base station 210.

A DEM such as the DEM 222a may comprise suitable logic, circuitry, interfaces and/or code that may be operable to demodulate data streams received from the base station 210 via the receive antenna 221a. The DEM 22a may be operable to communicate the demodulated data streams with the channel decoder 223a.

A channel decoder such as the channel decoder 223a may comprise suitable logic, circuitry, interfaces and/or code that may be operable to decode the demodulated data streams from the DEM 222a and generate channel decoded signals.

A channel estimator such as the channel estimator 224 may comprise suitable logic, circuitry, interfaces and/or code that may be operable to generate a channel estimate for a single user downlink MIMO channel between the base station 210 and the mobile device 220. The channel estimator 224 may be operable to estimate channel state information (CSI) such as, for example, channel capacity, channel direction, signal-to-interference and noise ratio (SINR) and/or channel quality indicator (CQI) for each associated subchannel of the single user downlink MIMO channel. The channel estimator 224 may also be operable to calculate projected CSI estimate such as, for example, projected channel capacity and relative channel direction with regard to the broadcast beams from the base station 210. The CSI estimate may be communicated with the channel quantizer 225 and/or the feedback controller 226, respectively, for further processing.

A channel quantizer such as the channel quantizer 225 may comprise suitable logic, circuitry, interfaces and/or code that may be operable to quantize the CSI estimate from the channel estimator 224. The quantized CSI estimate may be communicated with the feedback controller 226. In instances where the mobile device 220 may be a candidate for a user group for downlink data transmission, the channel quantizer 225 may be configured to hybrid quantize relative channel direction information with respect to a broadcast complementary orthogonal matrix indicating orthogonal beams of a MIMO channel between the base station 210 and, for example, a selected first user of the user group. In this regard, the channel quantizer 225 may be operable to first soft quantize relative channel direction information with respect to the broadcast complementary orthogonal matrix. Then, the soft quantized relative channel direction information may further be hard quantized to generate a semi-orthogonal flag matrix. The generated semi-orthogonal flag matrix indicates whether beams of the single user downlink MIMO channel between the base station 210 and the mobile device 220 are semi-orthogonal or approximately orthogonal to the beams indicated in the broadcast complementary orthogonal matrix. The generated semi-orthogonal flag matrix may be communicated with the base station 210 over the finite-rate feedback link 250.

A feedback controller such as the feedback controller 226 may comprise suitable logic, circuitry, interfaces and/or code that may be operable to generate quantized single user downlink MIMO channel CSI using corresponding quantized CSI from the channel quantizer 225. In one embodiment of the invention, the generated quantized single user downlink MIMO channel CSI may be communicated with the base station 210 over the feedback link 250. The feedback controller 226 may be operable to communicate the generated quantized single user downlink MIMO channel CSI via various CSI transmission schemes. For example, the generated single user downlink MIMO channel CSI may be transmitted in full, differentially, or a combination thereof. The generated single user downlink MIMO channel CSI may be communicated or reported periodically or a periodically. In another embodiment of the invention, the generated single user downlink MIMO channel CSI may be communicated with the base station 210 only when the change in the generated CSI exceeds a particular threshold. The CSI transmission scheme may be selected according to capacity of the feedback link 250, the generated quantized single user downlink MIMO channel CSI, and/or application types.

The feedback link 250 may comprise suitable logic, circuitry, interfaces and/or code that may be operable to communicate CSI from a plurality of associated mobile devices such as, for example, the mobile devices 220-240. In this regard, the feedback link 250 may be operable to communicate quantized single user downlink MIMO channel CSI reported from each associated mobile device. The reported quantized single user downlink MIMO channel CSI comprises channel quality information such as, for example, channel capacity, channel direction, projected channel capacity, relative channel direction, SINR, and/or CQI for corresponding single user downlink MIMO channels, for example, the single user downlink MIMO channel between the base station 210 and the mobile device 220.

In an exemplary operation, a plurality of signals to be transmitted may be encoded using the channel encoders 202a-202b. The user scheduler 204 may be operable to schedule data transmissions among a plurality of associated mobile devices such as the mobile devices 220-240. The user scheduler 204 may be operable to schedule data transmissions according to various scheduling criteria such as fairness and channel quality information. In this regard, the user scheduler 204 may be operable to perform user group selection according to quantized channel status information, reported by the mobile devices 220-240 over the feedback link 250. A mobile device having the strongest channel capacity may be selected as a first user in a user group for data transmissions. One or more mobile devices belonging to a semi-orthogonal group of the selected first user may be identified according to quantized orthogonality flag matrices received from the remaining mobile devices over the feedback link 250. The user scheduler 204 may be operable to select a mobile device having the strongest quantized projected channel capacity from the identified mobile devices in the semi-orthogonal group as a second user. The user scheduler 204 may be operable to schedule downlink data transmissions to the selected first user and/or the selected second user according to, for example, corresponding system capacity information.

Channel encoded data streams from the channel encoders 202a-202b may be modulated via the MODs 206a-206b, respectively. Signal power level on resulting modulated data streams may be adjusted or managed via the power control block 208. The beamforming or linear precoding block 210 may be operable process data streams from the power control block 208 and separate the processed data streams into multiple spatially independent data streams for transmission. The transmit antennas 211a-211b may be configured to transmit the multiple spatially independent data streams. In instances where a mobile device (receiver) such as the mobile device 220 may selected to receive at least a portion of the multiple spatially independent data streams, each of the receive antennas 221a-221b may be scheduled and/or assigned to receive spatially independent data streams from available transmit antennas of the base station 210. Data streams received, for example, via the receive antenna 221a, may be demodulated via the DEM 22a. The demodulated data streams may be channel decoded via the channel decoder 223a. The channel estimator 224 may be operable to estimate channel state information (CSI) for each subchannel of the single user downlink MIMO channel between the base station 210 and the mobile device 220. The estimated CSI may be quantized via the channel quantizer 225. The feedback controller may be operable to generate quantized single user downlink MIMO channel CSI using the quantized CSI. The generated quantized single user downlink MIMO channel CSI may be communicated with the base station 210 over the feedback channel 250.

In instances where channel direction information with respect to beams orthogonal to a single user downlink MIMO channel between the base station 210 and the mobile device 220 may be required, the channel quantizer 225 may be operable to soft quantize relative channel direction information, as required, with respect to the beams orthogonal to the single user downlink MIMO channel between the base station 210 and the selected first user. In this regard, the soft quantized relative channel direction information may be further hard quantized to generate a semi-orthogonal flag matrix. The generated semi-orthogonal flag matrix indicates whether beams of the single user downlink MIMO channel between the base station 210 and the mobile device 220 are semi-orthogonal or approximately orthogonal to the beams associated with the single user downlink MIMO channel between the base station 210 and the selected first user. The generated semi-orthogonal flag matrix may be communicated with the base station 210 over the finite-rate feedback link 250.

Figure 3:
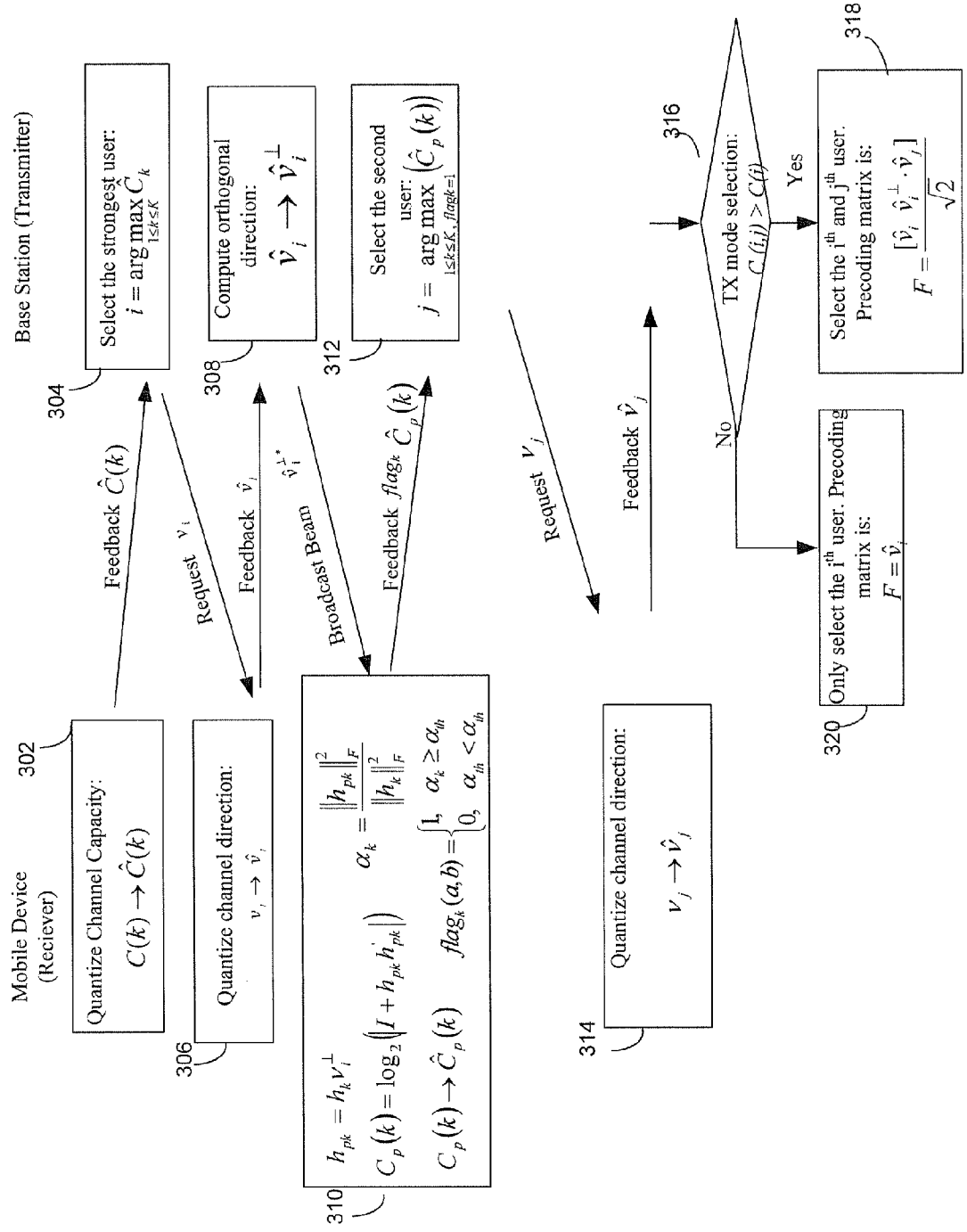
FIG. 3 is a flow diagram illustrating exemplary steps that are utilized to feedback hybrid-quantized channel direction information to accelerate user group selection, in accordance with an embodiment of the invention.

FIG. 3 is a flow diagram illustrating exemplary steps that are utilized to generate quantized channel state information for selecting a user group from MIMO capable mobile devices, in accordance with an embodiment of the invention. Referring to FIG. 3, Parameters i,j,k are mobile device (receiver) index, where 0<i,j,k≤K and a parameter K is the total number of mobile devices.

A parameter $C(k)$ represents channel capacity of the kth mobile device. A parameter $\hat{C}(k)$ represents quantized channel capacity of the kth mobile device. A parameter $\Delta C$ indicates a capacity correction term. A parameter $C_p(k)$ represents a projected channel capacity of the kth mobile device with respect to a broadcast channel direction from a base station. A parameter $\hat{C}_p(k)$ represents quantized $C_p(k)$. A parameter $C(i,j)$ represents the total mutual channel capacity or rate of the ith mobile device and the jth mobile device. A parameter $\hat{C}(i,j)$ represents quantized $C(i,j)$. A parameter $v_k$ represents channel direction of the kth mobile device. A parameter $\hat{v}_k$ represents quantized channel direction of the kth mobile device. A parameter $\alpha_k$ represents an orthogonality measurement of the kth mobile device with respect to a broadcast channel direction from a base station. A parameter $\hat{\alpha}_k$ represents quantized $\alpha_k$. A parameter $h_k$ represents a channel impulse response matrix estimate of a single user downlink MIMO channel associated with the kth mobile device. A parameter $h_{pk}$ represents a projected channel impulse response matrix with respect to a broadcast channel direction from a base station. A parameter $\hat{h}_{pk}$ represents quantized $h_{pk}$.

It may be assumed that the base station 210 may be operable to utilize M available antennas for downlink transmissions, where M is an integer and M>1. A mobile device such as the mobile device 220 may be operable to utilize N available antennas to receive downlink transmissions from the base station 210, where N is an integer. The channel impulse response matrix estimate, $h_k$, of the single user downlink MIMO channel associated with the kth mobile device may be expressed as following $$h_k = \begin{bmatrix} h_k(1,1) & h_k(1,2) & \ldots & h_k(1,M) \\ h_k(2,1) & h_k(2,2) & \ldots & h_k(2,M) \\ \ldots \\ h_k(N,1) & h_k(N,2) & \ldots & h_k(N,M) \end{bmatrix},$$

where M is available transmit antennas and N is available receive antennas of the kth mobile device, and $h_k(i,j)$, ($1 \leq i \leq N$, $1 \leq j \leq M$) is channel impulse response estimate for a spatial subchannel between the ith transmit antenna of the base station 210 and the jth receive antenna of the kth mobile device.

The quantized channel capacity, $\hat{C}(k)$, may be calculated using, for example, $$C(k) = \log_2(|I + h_k h_k'|)$$

Referring to FIG. 3, the exemplary steps start with step 302, an associated mobile device such as the kth mobile device may be operable to receive multiple spatially independent data streams from the base station 210 via available receive antennas such as the receive antennas 221a-221b. The channel estimator 224 may be operable to estimate channel status information (CSI) such as, for example, the channel capacity, $C(k)$, of the kth mobile device. The estimated $C(k)$ may be quantized into $\hat{C}(k)$ via the channel quantizer 225. The quantizer 225 may be configured to perform channel capacity and/or channel direction quantization by matching performance of the beamforming or linear precoding block 209 at the base station 210. The quantized channel capacity $\hat{C}(k)$ may be communicated as CSI with the base station 210 via a rate constrained feedback channel such as the feedback channel 250.

In step 304, the base station 210 may be operable to receive $\hat{\gamma}_k$, where $1 \leq k \leq K$. The user scheduler 204 may be operable to select, for example, the ith mobile device, which is associated with the strongest quantized channel capacity, i.e., $$i = \arg\max_{1 \leq k \leq K} \hat{C}_k,$$

as a first user for a user group. The base station 210 may be operable to send a request to the selected first user, namely, the ith mobile device, for channel direction information associated with the single user downlink MIMO channel between the base station 210 and the ith mobile device. The requested channel direction may indicate direction information of a corresponding MIMO channel. For example, the channel direction, $v_l$, of the lth mobile device may indicate direction information of the MIMO channel between the base station 210 and the ith mobile device.

In step 306, the selected first user, namely, the ith mobile device, may be operable to receive the request from the base station 210 for channel direction information. The lth mobile device may be operable to compute $v_l$ via, for example, taking the right singular vector matrix of $h_l$. The computed $v_l$ may be matrix/vector quantized via, for example, the channel quantizer 225, to generate $\hat{v}_l$. A quantization resolution of, for example, $B_v$ bits per channel update, may be used for the matrix quantization on the computed $v_l$. The ith mobile device may be operable to feedback the generated $\hat{v}_l$ to the base station 210 over the feedback link 250.

In step 308, the base station 210 may be operable to receive the quantized matrix of $\hat{v}_i$ from the ith mobile device over the feedback link 250. The base station 210 may be operable to generate complementary orthogonal matrix $\hat{v}_i^\perp$ of the received matrix $\hat{v}_i$. The $\hat{v}_i$ and the $\hat{v}_i^\perp$ are in different dimensions. For example, with 6 transmit antenna at the base station 210 and 2 receive antenna at the ith mobile device, the dimension of the $\hat{v}_i$ is a 6×2. The $\hat{v}_i$ and the $\hat{v}_i^\perp$ are of dimensions of 6×2 and 6×4, respectively. The base station 210 may be operable to utilize the generated orthogonal complementary matrix $\hat{v}_i^\perp$ as the beamforming matrix for the beamforming or linear precoding block 209. The base station 210 may also be operable to broadcast the generated orthogonal complementary matrix $\hat{v}_i^\perp$ to the entire serving area (cell).

In step 310, each associated mobile device such as the kth mobile device may be operable to receive the broadcast complementary orthogonal matrix $\hat{v}_i^\perp$. A mobile device such as the kth mobile device may be operable to estimate a projection channel matrix $h_{Pk}$, given by $h_{Pk}=h_k \hat{v}_i^\perp$. The projection matrix $h_{Pk}$ indicates relative channel direction information with respect to the received the broadcast complementary orthogonal matrix $\hat{v}_i^\perp$. In order to measure the orthogonality of the channel directions between the k-th user and the i-th user, an orthogonality measurement $\alpha_k$ may be calculated using, for example, $$\alpha_k = \frac{\|h_{Pk}\|_F^2}{\|h_k\|_F^2}.$$

In addition, the k-th mobile device may also be configured to compute a projected channel capacity give by, for example, $$C_P(k)=\log_2(|I+h_{Pk}h_{Pk}'|)$$

The calculated orthogonality measurement $\alpha_k$ indicates relative channel direction information with respect to the broadcast complementary orthogonal matrix $\hat{v}_i^\perp$. The generated orthogonality measurement $\alpha_k$ may be soft quantized, $\hat{\alpha}_k$. In this regard, the kth mobile device may also be operable to hard quantize (threshold) the resulting $\hat{\alpha}_k$ to generate an orthogonality flag by $$flag_k = \begin{cases} 1, & \hat{\alpha}_k \geq \alpha_{th} \\ 0, & \hat{\alpha}_k < \alpha_{th} \end{cases},$$

where $\alpha_{th}$ is a pre-determined threshold value. The generated orthogonality flag, $flag_k$, comprises one bit information that may be viewed as a flag partitioning remaining mobile devices (except the selected first user, namely, the ith mobile device) into two groups. For example, $flag_k=1$ indicates that the spatial channel (MIMO channel) of the kth mobile device is semi-orthogonal or approximately orthogonal to the single user downlink MIMO channel of the ith mobile device. The $flag_k=0$ indicates that the spatial channel (MIMO channel) of the kth mobile device is not semi-orthogonal to the single user downlink MIMO channel of the ith mobile device. Mobile devices with beams semi-orthogonal to the single user downlink MIMO channel of the ith mobile device may form a semi-orthogonal group of the ith mobile device, which may be represented as $S=\{k: flag_k=1, 1 \leq k \leq K\}$.

The calculated projected channel capacity $C_P(k)$ may be quantized to $\hat{C}_P(k)$. The generated orthogonality flag matrix $flag_k$ and the quantized $\hat{C}_P(k)$ may be communicated to the base station 210 over the feedback link 250. The computation of the projected channel capacity $C_P(k)$ may be optional at the mobile device kth mobile device. In instances where the kth mobile device may be configured not to support the computation of the projected channel capacity $C_P(k)$, only the generated orthogonality flag matrix $flag_k$ may be transmitted to base station 210 over the feedback link 250.

In step 312, the base station 210 may be operable to receive orthogonality flag matrices such as $flag_k$ and quantized projected channel capacity such as the quantized $\hat{C}_P(k)$ from the remaining mobile devices. In instances where no quantized projected channel capacity $C_P(k)$ may be received from the kth mobile device, the base station 210 may be configured to generate a projected channel capacity $C_P(k)$ for the kth mobile device. The generated projected channel capacity $C_P(k)$ may be used as corresponding quantized projected channel capacity $\hat{C}_P(k)$ for the kth mobile device for user selection.

Mobile devices with beams orthogonal or approximately orthogonal, namely, $flag_k=1$, to the single user downlink MIMO channel of the selected first user may form a semi-orthogonal group of the selected first user. The user scheduler 204 may be operable to select a mobile device having the strongest quantized projected channel capacity, i.e., $$j = \underset{1 \leq k \leq K, flag_k=1}{\operatorname{argmax}} (\hat{C}_P(k)),$$

from the semi-orthogonal group as a second user for the user group. The base station 210 may be operable to send a request to the selected second user, namely, the jth mobile device, for channel direction information associated with the single user downlink MIMO channel between the base station 210 and the jth mobile device.

In step 314, the selected second user, namely, the jth mobile device, may be operable to receive the request from the base station 210 for channel direction information. The jth mobile device may be operable to compute $v_j$, which may be, for example, the right singular vector matrix of $h_{Pj}$. The computed $v_j$ may be matrix quantized via, for example, the channel quantizer 225, to generate $\hat{v}_j$. The jth mobile device may be operable to feedback the generated $\hat{v}_j$ to the base station 210 over the feedback link 250.

In step 316, the base station may be configured to determine whether 2 users or 1 user may be supported based on the current channel condition. For example, it may be determined whether $C(i,j)>C(i)$. The total mutual channel capacity or rate $C(i,j)$ may be calculated by, for example, $$C(i,j)=\log_2(|I+h_i h_i'/2|)+\log_2(|I+h_{Pj}h_{Pj}'/2|).$$

In instances where the base station 210 may not have the complete CSI information, the total mutual channel capacity or rate $C(i,j)$ may be approximated by, for example, $$C(i,j) \approx \log_2(|I+h_i h_i'|)+\log_2(|I+h_{Pj}h_{Pj}'|) - \Delta C \approx \hat{C}(i)+\hat{C}_P(j) - \Delta C,$$

where the parameter $\Delta C$ indicates a capacity correction term. The parameter $\Delta C$ may be determined based on, for example, SNR, SNIR and/or number if transmit/receive antennas, and may be implemented, for example, as a programmable register. In instances where $C(i,j)>C(i)$, then in step 318, the base station 210 may be operable to allocate equal transmission power to both the ith mobile device and the jth mobile device to transmit multiple spatially independent data streams to the ith mobile device and the jth mobile device, respectively, over corresponding single user downlink MIMO channels. The base station 210 may be operable to set a precoding matrix as $$F = \frac{[\hat{v}_i \; \hat{v}_i^\perp \cdot \hat{v}_j]}{\sqrt{2}}.$$

In step 316, in instances where $C(i,j) \leq C(i)$, then in step 320, the base station 210 may be operable to allocate full transmission power only to the ith mobile device to transmit multiple spatially independent data streams to the ith mobile device, over a corresponding single user downlink MIMO channel. The base station 210 may be operable to set a precoding matrix as $F=\hat{v}_i$.

Although a user group of two users (mobile devices) is illustrated in FIG. 3, the invention may not be so limited. Accordingly, a user group comprising more than 2 users (mobile devices) may be supported without departing from the spirit and scope of various embodiments of the invention.

Figure 4:
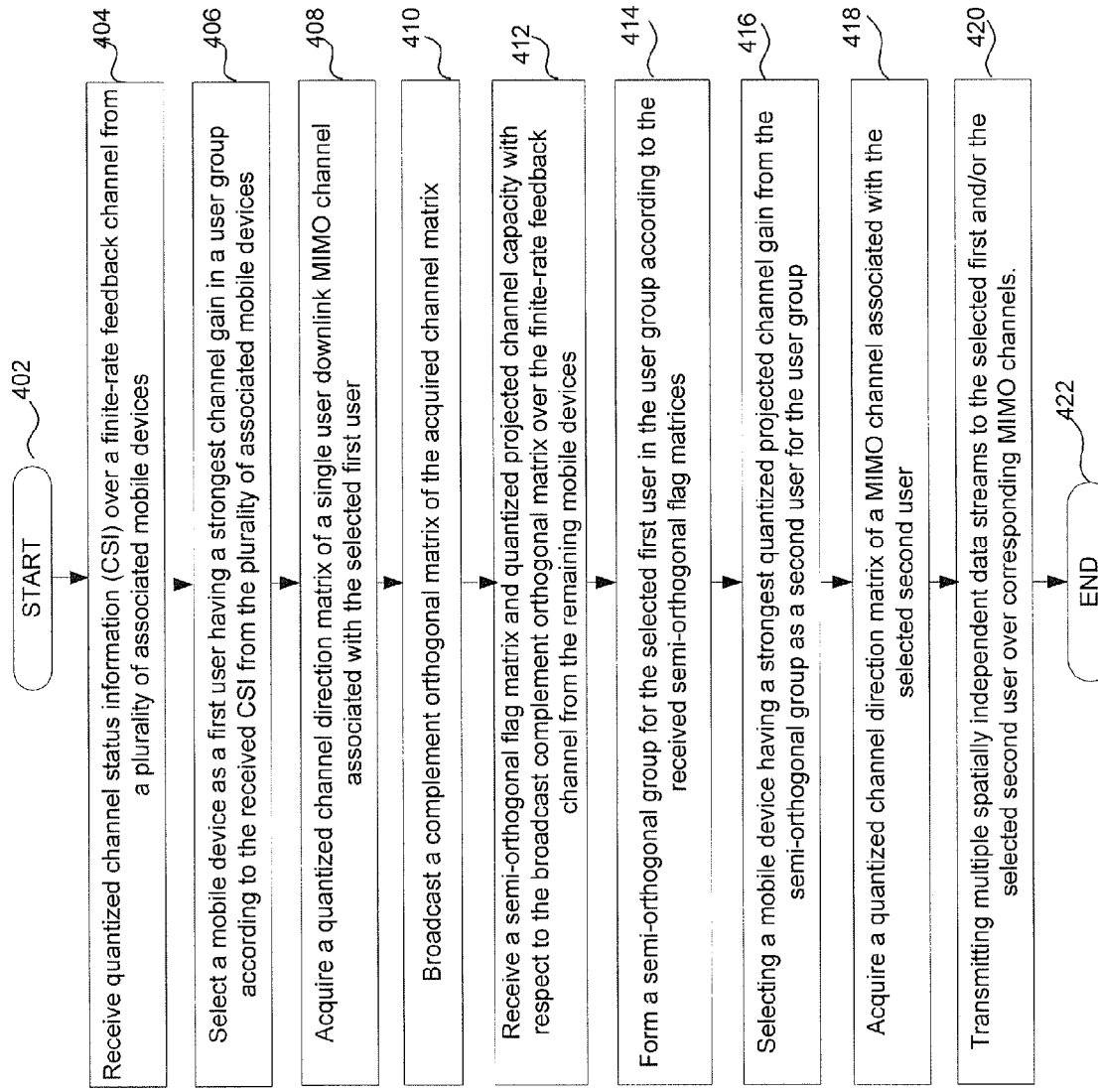
FIG. 4 is a flow diagram illustrating exemplary steps for expediting user group selection by using hybrid-quantized channel direction information, in accordance with an embodiment of the invention.

FIG. 4 is a flow diagram illustrating exemplary steps for expediting user group selection by using hybrid-quantized channel direction information, in accordance with an embodiment of the invention. Referring to FIG. 4, the exemplary steps start with step 402, the base station 210 may be equipped with multiple transmit antennas for transmitting multiple spatially independent data streams to one or more associated multi-antenna mobile devices. In step 404, the base station 210 may be operable to receive quantized channel status information (CSI) from a plurality of associated multi-antenna mobile devices. The received quantized CSI from a mobile device such as the mobile device 220 may indicate channel quality information such as channel capacity over the entire spatial subchannels of a single user downlink MIMO channel between the base station 210 and the mobile device 220. The CSI may be received over a finite-rate feedback channel such as the feedback channel 250. In step 406, the base station 210 may be operable to select a mobile device having the strongest channel capacity as a first user for a user group according to corresponding received CSI.

In step 408, the base station 210 may be operable to acquire a channel direction matrix of a single user downlink MIMO channel associated with the selected first user. In return, the base station 210 may be operable to receive a quantized channel direction matrix for the single user downlink MIMO channel associated with the selected first user. In step 410, the base station 210 may be operable to broadcast a complementary orthogonal matrix of the acquired channel direction matrix for the single user downlink MIMO channel associated with the selected first user. In step 412, the base station 210 may be operable to receive a semi-orthogonal flag matrix and quantized projected channel capacity with respect to the broadcast complementary orthogonal matrix from each of the remaining mobile devices. In step 414, the base station 210 may be operable to form a semi-orthogonal group of the selected first user in the user group according to the received orthogonality flag matrices. In step 416, the base station 210 may be operable to select a mobile device having the strongest quantized projected channel capacity with respect to the received orthogonality flag matrices from the semi-orthogonal group as a second user for the user group. In step 418, the base station 210 may be operable to acquire channel direction information for the selected second user. In return, the base station 210 may be operable to receive quantized channel direction information from the selected second user. In step 420, the base station 210 may be operable to schedule and transmit multiple spatially independent data streams to the selected first and/or the second user in the user group according to channel capacity and/or mutual information rate of the two selected users. The exemplary steps end in step 422.

Aspects of a method and system for selecting a user group using hybrid-quantized channel direction information feedbacks from MIMO capable mobile devices are provided. In accordance with various embodiments of the invention, a communication device such as the mobile device 220 may be operable to receive a plurality of beams orthogonal to a single user downlink MIMO channel between the base station 210 and a selected first user such as the mobile device 240 for a user group. The mobile device 220 may be operable to estimate relative channel direction information with respect to the received plurality of beams for a MIMO channel between the base station 210 and the mobile device 240. The estimated relative channel direction information may be soft quantized via the channel quantizer 245. The soft quantized relative channel information may be further hard quantized using a predetermined threshold value. The mobile device 240 may be operable to receive downlink data transmission from the base station according to the resulting hybrid-quantized relative channel direction information. The mobile device 240 may be operable to generate a semi-orthogonal matrix with respect to the received plurality of beams using the hybrid-quantized relative channel direction information. The generated semi-orthogonal matrix may be transmitted to the base station 210 over a finite-rate feedback link such as the feedback link 250. In this regard, the base station 210 may be operable to receive a plurality of semi-orthogonal matrices from remaining mobile devices.

The base station 210 may be operable to generate a semi-orthogonal group for the selected first user based on the received semi-orthogonal matrices from the remaining mobile devices. The generated semi-orthogonal group for the first selected user comprises mobile devices with beams over associated single user downlink MIMO channels approximately orthogonal to the single user downlink MIMO channel between the base station 210 and the selected first user. The base station 210 may be operable to select a mobile device having the strongest quantized projected channel capacity from the generated semi-orthogonal group as a second user for the user group. The base station 210 may be operable to determine total mutual channel capacity of the selected first user and the selected second user. The base station 210 may be operable to schedule downlink data transmissions intended to the selected first user and/or the selected second user according to the total mutual channel capacity.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for selecting a user group using hybrid-quantized channel direction information feedbacks from MIMO capable mobile devices.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method in a base station, comprising:
   transmitting a plurality of beams orthogonal to a downlink multiple-input multiple-output (MIMO) channel from a base station to a first receiver of a first group of receivers;
   receiving from the first receiver a semi-orthogonal matrix based on the plurality of beams;
   identifying a second group of receivers based on the received semi-orthogonal matrix;
   selecting a second receiver from the second group of receivers based on the received semi-orthogonal matrix; and
   transmitting data to the second receiver.

2. The method of claim 1 wherein the semi-orthogonal matrix is further based on an estimated relative channel direction of a downlink MIMO channel between the base station and the first receiver.

3. The method of claim 2 wherein the semi-orthogonal matrix is further based on a soft quantizing of the estimated relative channel direction information.

4. The method of claim 3 wherein the semi-orthogonal matrix is further based on a hard quantizing of said soft quantized relative channel direction information.

5. The method of claim 4 wherein the base station transmits data based on the hard quantized relative channel direction information to the first receiver.

6. The method of claim 5 wherein base station communicates with receivers of the second group of receivers using communication channels approximately orthogonal to a downlink MIMO channel between the base station and the first receiver of the first group of receivers.

7. The method of claim 1 wherein base station communicates with receivers of the second group of receivers using communication channels approximately orthogonal to a downlink MIMO channel between the base station and the first receiver of the first group of receivers.

8. The method according to claim 6, wherein the base station selects a communication device having a strongest quantized projected channel capacity from the generated semi-orthogonal group as a second receiver for the second group of receivers.

9. The method according to claim 7, wherein said base station determines total mutual channel capacity of the selected first receiver and the selected second receiver.

10. The method according to claim 8, wherein the base station schedules data transmission to the selected first receiver and/or the selected second receiver based on the total mutual channel capacity.

11. A wireless transceiver, comprising:
    circuitry configured for transmitting a plurality of beams orthogonal to a downlink multiple-input multiple-output (MIMO) channel from a base station to a first receiver of a first group of receivers;
    wherein:
    the wireless transceiver is operable to receive from the first receiver a semi-orthogonal matrix based on the plurality of beams;
    the wireless transceiver is operable to identify a second group of receivers based on the received semi-orthogonal matrix; and
    the wireless transceiver is operable to select a second receiver from the second group of receivers based on the received semi-orthogonal matrix; and
    circuitry configured for transmitting data to the second receiver.

12. The wireless transceiver of claim 11 wherein the semi-orthogonal matrix is further based on an estimated relative channel direction of a downlink MIMO channel between the base station and the first receiver.

13. The wireless transceiver of claim 12 wherein the semi-orthogonal matrix is further based on a soft quantizing of the estimated relative channel direction information.

14. The wireless transceiver of claim 13 wherein the semi-orthogonal matrix is further based on a hard quantizing of the soft quantized relative channel direction information.

15. The wireless transceiver of claim 14 wherein the base station transmits data based on the hard quantized relative channel direction information to the first receiver.

16. The wireless transceiver of claim 15 wherein base station communicates with receivers of the second group of receivers using communication channels approximately orthogonal to a downlink MIMO channel between the base station and the first receiver of the first group of receivers.

17. The wireless transceiver of claim 11 wherein base station communicates with receivers of the second group of receivers using communication channels approximately orthogonal to a downlink MIMO channel between the base station and the first receiver of the first group of receivers.

18. The wireless transceiver according to claim 16, wherein the base station selects a communication device having a strongest quantized projected channel capacity from the generated semi-orthogonal group as a second receiver for the second group of receivers.

19. The wireless transceiver according to claim 17, wherein the base station determines total mutual channel capacity of the selected first receiver and the selected second receiver.

20. The wireless transceiver according to claim 18, wherein the base station schedules data transmission to the selected first receiver and/or the selected second receiver based on the total mutual channel capacity.

* * * * *